US010189559B2

(12) United States Patent
Geiger et al.

(10) Patent No.: US 10,189,559 B2
(45) Date of Patent: Jan. 29, 2019

(54) ROTOR SPEED CONTROL USING A FEED-FORWARD ROTOR SPEED COMMAND

(71) Applicant: Sikorsky Aircraft Corporaton, Startford, CT (US)

(72) Inventors: Derek Geiger, Wilton, CT (US); Ole Wulff, Ansonia, CT (US); Jonathan Aaron Litwin, West Haven, CT (US); Aaron L. Greenfield, Pittsburgh, PA (US)

(73) Assignee: SIKORSKY AIRCRAFT CORPORATION, Startford, CT (US)

( * ) Notice: Subject to any disclaimer, the term of this patent is extended or adjusted under 35 U.S.C. 154(b) by 72 days.

(21) Appl. No.: 15/358,700

(22) Filed: Nov. 22, 2016

(65) Prior Publication Data

US 2018/0141640 A1    May 24, 2018

(51) Int. Cl.
| | |
|---|---|
| *B64C 13/06* | (2006.01) |
| *B64C 13/16* | (2006.01) |
| *B64C 27/06* | (2006.01) |
| *B64C 13/04* | (2006.01) |
| *B64D 31/06* | (2006.01) |
| *B64C 13/40* | (2006.01) |
| *B64C 27/57* | (2006.01) |
| *G05D 1/08* | (2006.01) |

(52) U.S. Cl.
CPC ............. *B64C 13/16* (2013.01); *B64C 13/04* (2013.01); *B64C 13/40* (2013.01); *B64C 27/06* (2013.01); *B64C 27/57* (2013.01); *B64D 31/06* (2013.01); *G05D 1/0858* (2013.01)

(58) Field of Classification Search
None
See application file for complete search history.

(56) References Cited

U.S. PATENT DOCUMENTS

| | | | | |
|---|---|---|---|---|
| 6,064,924 A | * | 5/2000 | Fleischmann | G01S 7/411 701/16 |
| 6,189,836 B1 | * | 2/2001 | Gold | G05D 1/0816 244/17.13 |

(Continued)

FOREIGN PATENT DOCUMENTS

| | | |
|---|---|---|
| EP | 2631172 A2 | 8/2013 |
| WO | 2016167865 A1 | 10/2016 |

OTHER PUBLICATIONS

European Search Report dated May 2, 2018 cited in Application No. 17190849.4, 6 pgs.

*Primary Examiner* — Truc M Do
(74) *Attorney, Agent, or Firm* — Cantor Colburn LLP

(57) ABSTRACT

Examples of rotor speed reduction using a feed-forward rotor speed control command are provided. In one example, a computer-implemented method includes: receiving, by a processing device, flight command indicative of a change in a flight characteristic of an aircraft comprising a rotor; generating, by the processing device, a change in load factor based on the flight command; generating, by the processing device, a change in rotor speed based on the change in load factor; generating, by the processing device, a rotor speed command based on the change in rotor speed to a flight controller to cause the aircraft to change a rotor speed of the rotor; and changing, by the processing device, the rotor speed of the rotor responsive to the rotor speed command.

13 Claims, 4 Drawing Sheets

(56) References Cited

U.S. PATENT DOCUMENTS

| | | | |
|---|---|---|---|
| 6,474,603 B1* | 11/2002 | Kinkead | G05D 1/0825 244/17.13 |
| 6,592,071 B2* | 7/2003 | Kinkead | G05D 1/102 244/194 |
| 6,879,885 B2 | 4/2005 | Driscoll et al. | |
| 7,363,120 B2* | 4/2008 | Aubourg | B64C 27/008 244/17.11 |
| 8,201,771 B2* | 6/2012 | Kessler | B64C 27/001 244/17.13 |
| 8,231,085 B2* | 7/2012 | Cherepinsky | B64C 13/503 244/223 |
| 8,271,151 B2* | 9/2012 | Hasan | B64C 13/00 701/3 |
| 8,332,082 B2* | 12/2012 | Christensen | G05D 1/0858 244/180 |
| 8,989,921 B2* | 3/2015 | Nannoni | G05D 1/0858 701/1 |
| 9,102,400 B2* | 8/2015 | Cherepinsky | B64C 13/04 |
| 9,156,546 B2* | 10/2015 | Irwin, III | B64C 13/10 |
| 9,162,752 B2* | 10/2015 | Christensen | G05D 1/102 |
| 9,193,453 B2 | 11/2015 | Vallart et al. | |
| 9,304,516 B2* | 4/2016 | Christensen | G05D 1/102 |
| 9,317,042 B2* | 4/2016 | Greenfield | G05D 1/0858 |
| 9,399,511 B2* | 7/2016 | Kim | B64C 13/503 |
| 9,771,145 B2* | 9/2017 | Kim | B64C 13/503 |
| 2003/0135306 A1 | 7/2003 | Driscoll et al. | |
| 2008/0234881 A1* | 9/2008 | Cherepinsky | G05D 1/0858 701/7 |
| 2008/0237392 A1* | 10/2008 | Piasecki | B64C 27/26 244/6 |
| 2011/0057071 A1* | 3/2011 | Sahasrabudhe | G05D 1/0858 244/17.13 |
| 2013/0206899 A1* | 8/2013 | Sahasrabudhe | G05D 1/0858 244/17.13 |
| 2015/0028152 A1* | 1/2015 | Eller | B64C 27/001 244/17.13 |
| 2015/0210381 A1* | 7/2015 | Greenfield | G05D 1/0858 701/3 |
| 2015/0367937 A1 | 12/2015 | Greenfield et al. | |
| 2016/0224030 A1* | 8/2016 | Wulff | B64C 27/10 |

* cited by examiner

ROTOR SPEED CONTROL USING A FEED-FORWARD ROTOR SPEED COMMAND

STATEMENT OF FEDERAL SUPPORT

This invention was made with government support under W911W6-14-2-0005 awarded by the Army. The government has certain rights in the invention.

BACKGROUND OF THE INVENTION

The subject matter disclosed herein relates to controlling rotor speed, and more particularly, to rotor speed control using a feed-forward rotor speed reduction command.

Certain aircraft (e.g., helicopters) utilize rotors to create propulsion and lift for flight. By reducing the rotational speed of the rotor, main rotor efficiency can be increased. This increases efficiency of the overall aircraft, enabling the aircraft to fly further, longer and/or faster hence more economically.

BRIEF DESCRIPTION OF THE INVENTION

According to one embodiment of the invention, a computer-implemented method for feed-forward rotor speed command, the method comprising: receiving, by a processing device, flight command indicative of a flight characteristic change of an aircraft comprising a rotor; generating, by the processing device, a load factor change based on the flight command; generating, by the processing device, a rotor speed change based on the load factor change; generating, by the processing device, a rotor speed command based on the rotor speed change to a flight controller to cause the aircraft to change a rotor speed of the rotor; and changing, by the processing device, the rotor speed of the rotor responsive to the rotor speed command.

In addition to one or more of the features described above, or as an alternative, wherein the change of the rotor speed represents an increase to the rotor speed responsive to an increase in the load factor.

In addition to one or more of the features described above, or as an alternative, the change of the rotor speed represents a decrease to the rotor speed responsive to a decrease in the load factor.

In addition to one or more of the features described above, or as an alternative, the flight command is responsive to a pilot command from a pilot of the aircraft.

In addition to one or more of the features described above, or as an alternative, the pilot command is a command to maneuver the aircraft.

In addition to one or more of the features described above, or as an alternative, the load factor change is further based on flight information.

In addition to one or more of the features described above, or as an alternative, the flight information is a velocity.

In addition to one or more of the features described above, or as an alternative, the flight characteristics are selected from the group consisting of a pitch rate, a vertical rate, a pitch attitude, a roll attitude, and a velocity.

According to another embodiment, a processing system for feed-forward rotor speed reduction using a feed-forward rotor speed reduction command, the system comprising: a memory having computer readable instructions; and a processing device for executing the computer readable instructions to perform a method, the method comprising: receiving, by the processing device, first flight command indicative of a first flight characteristic change of an aircraft comprising a rotor; generating, by the processing device, a first load factor change based on the first flight command; generating, by the processing device, a first rotor speed change based on the first load factor change; generating, by the processing device, a first rotor speed command based on the first rotor speed change to a flight controller to cause the aircraft to change a rotor speed of the rotor to a first rotor speed; and increasing, by the processing device, the rotor speed of the rotor responsive to the rotor speed command.

In addition to one or more of the features described above, or as an alternative, the method further comprises receiving, by the processing device, second flight command indicative of a second flight characteristic change of the aircraft.

In addition to one or more of the features described above, or as an alternative, the method further comprises generating, by the processing device, a second load factor change based on the second flight command.

In addition to one or more of the features described above, or as an alternative, the method further comprises generating, by the processing device, a second rotor speed change based on the second load factor change.

In addition to one or more of the features described above, or as an alternative, the method further comprises generating, by the processing device, a second rotor speed command based on the second rotor speed change to the flight controller to cause the aircraft to change the rotor speed of the rotor to a second rotor speed.

In addition to one or more of the features described above, or as an alternative, the method further comprises decreasing, by the processing device, the rotor speed of the rotor responsive to the rotor speed command.

In addition to one or more of the features described above, or as an alternative, the first flight command is responsive to a first pilot command from a pilot of the aircraft, and the second flight command is responsive to a second pilot command from the pilot of the aircraft.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
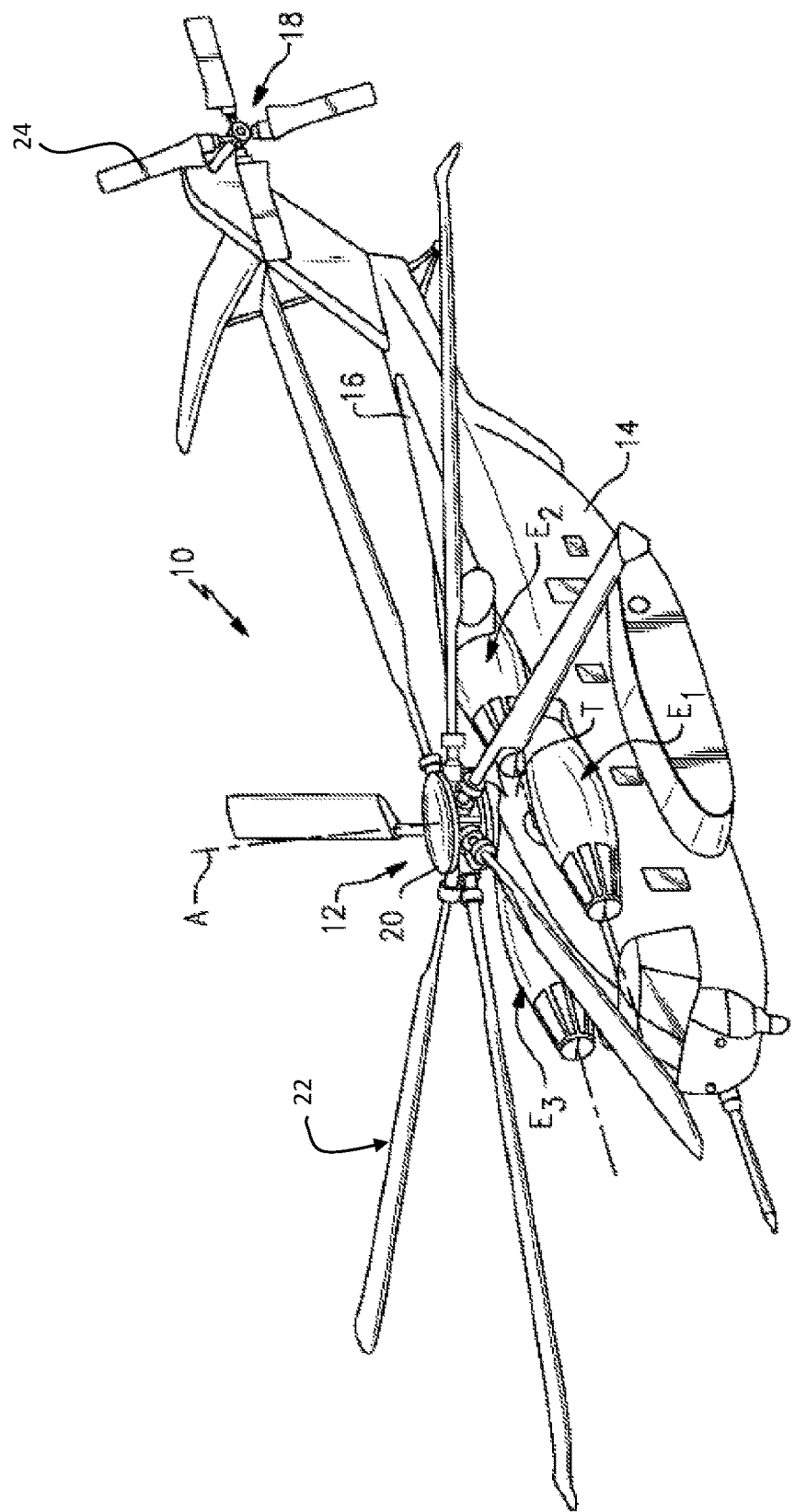
FIG. 1 illustrates a block diagram of a rotary wing aircraft having a main rotor assembly according to examples of the present disclosure.

The detailed description explains embodiments of the invention, together with advantages and features, by way of example with reference to the drawings.

DETAILED DESCRIPTION OF THE INVENTION

Reducing rotor speed below nominal in high-speed operating environment provides benefits such as increased performance (e.g., increases in range, loiter times, maximum speed, reduced drag, etc.) and susceptibility (e.g., decreases in noise, etc.). For example, rotor speed may be reduced as much as 15% or even 20% below nominal. However, the reduction of rotor speed decreases aircraft maneuvering capabilities and may cause the aircraft to exceed certain performance constraints (e.g., tip clearance, hub loads, etc.).

The present techniques introduce a rotor speed feed-forward command to provide for maneuverability and constraint avoidance. The feed-forward command represents a command fed into an engine controller for an aircraft to vary rotor speed based on a flight command (e.g., a pilot's command to maneuver the aircraft). This ensures that rotor speed is sufficient to enable the aircraft to continue flight through the maneuver. In particular, the rotor speed feed-forward command is based on pilot commands or from an autonomous system, such as commanded rates, attitudes, etc. The pilot commands are converted into a delta load factor command, which is related to a delta rotor speed command. The delta rotor speed command is added to a rotor speed reference command. In examples, tactile, aural, visual cues, etc. can be provided to pilot prior to and/or during transition.

The present techniques provide benefits and advantages. For example, the present techniques enable a lower rotor speed in steady-state flight while being able to transition to full rotor speed for maneuverability (e.g., load factor) and safety (e.g., tip clearance, hub moment, etc.). Additionally, the rotor speed change can be directly related to pilot or autonomous system commands. The rotor reduction feed-forward command can provide system load (i.e., no waiting for load factor to build up). The rotor reduction feed-forward command also does not impact system stability. Incremental changes in rotor speed based on flight conditions are also possible. These and other advantages are evident from the present disclosure.

Example embodiments of the disclosure include or yield various technical features, technical effects, and/or improvements to technology. For instance, example embodiments of the disclosure provide the technical effect of increasing rotor speed for an aircraft responsive to a flight command, such as a pilot issuing a command to maneuver the aircraft. As a result, maneuverability of the aircraft is increased. The present techniques improve safety and operational efficiency, such as of an aircraft, by increasing rotor speed when needed. As a result of these technical features and technical effects, example embodiments of the disclosure constitute an improvement to existing flight control systems. It should be appreciated that the above examples of technical features, technical effects, and improvements to technology of example embodiments of the disclosure are merely illustrative and not exhaustive.

FIG. 1 schematically illustrates an example of a rotary wing aircraft 10 having a main rotor assembly 12 according to examples of the present disclosure. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
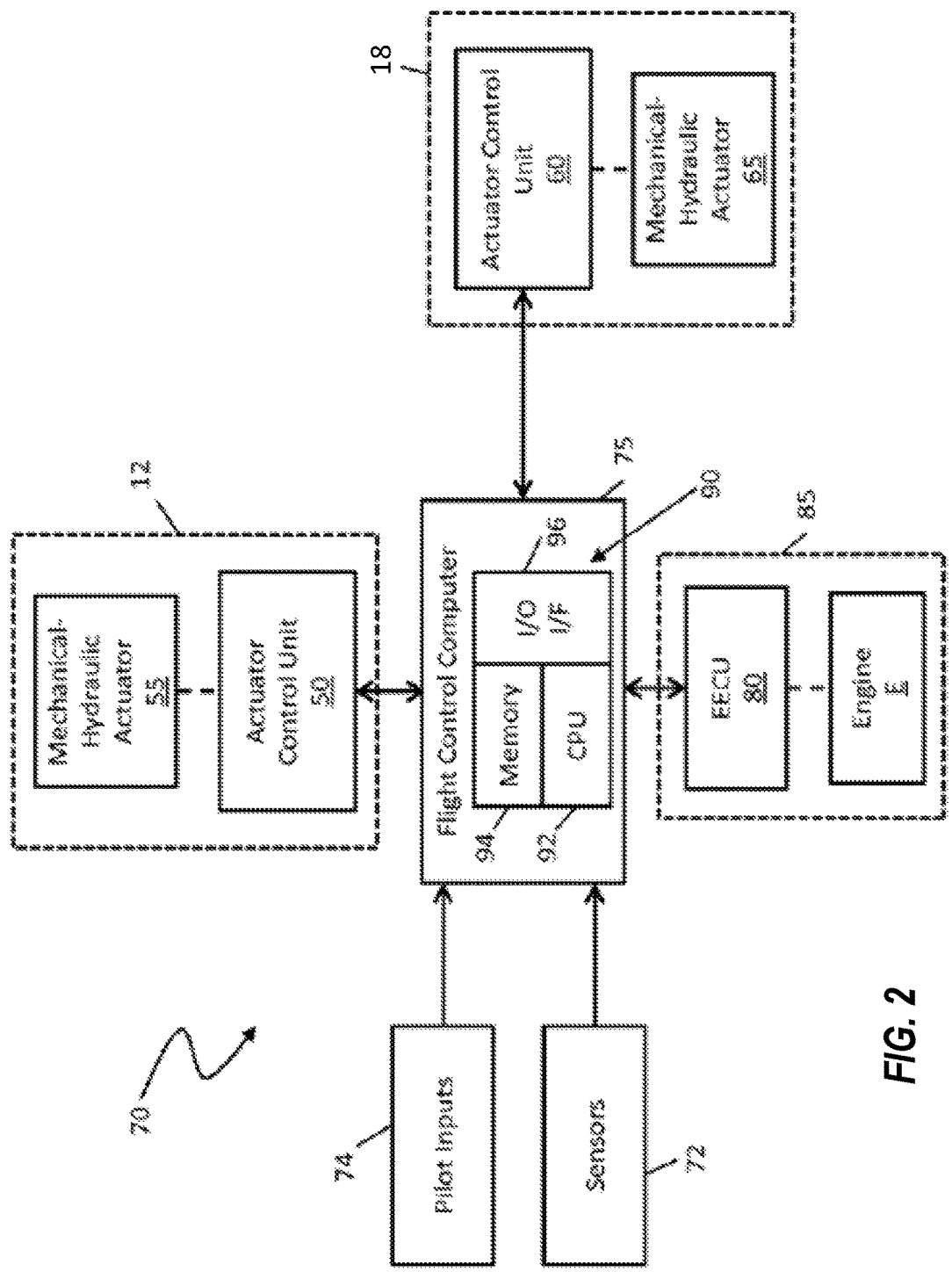
FIG. 2 illustrates a block diagram of a flight control system of an aircraft according to aspects of the present disclosure.

Portions of the aircraft 10, such as the main rotor system 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies 20 or propeller blades 24 for example, of the aircraft 10 of FIG. 1. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands to control the lift, propulsive thrust, yaw, pitch, and roll forces and moments of the various control surfaces of the aircraft 10.

In response to inputs from the sensors 72 and pilot inputs 74, the FCC 75 transmits signals to various subsystems of the aircraft 10, such as the main rotor system 12 and the tail rotor system 18. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and/or collective commands may result in the actuator control unit 50 driving the one or more actuators 55 to adjust a swashplate assembly to control the rotor blade assemblies 20 of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator, associated with one or more propeller blades 24. In an embodiment, pilot inputs 74 include a propeller pitch command for the actuator control unit 60 to drive the one or more actuators 65 for controlling the propeller blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine E may include one or more instances of the EECU 80 to control engine output and performance. Engines E may be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

Figure 3:
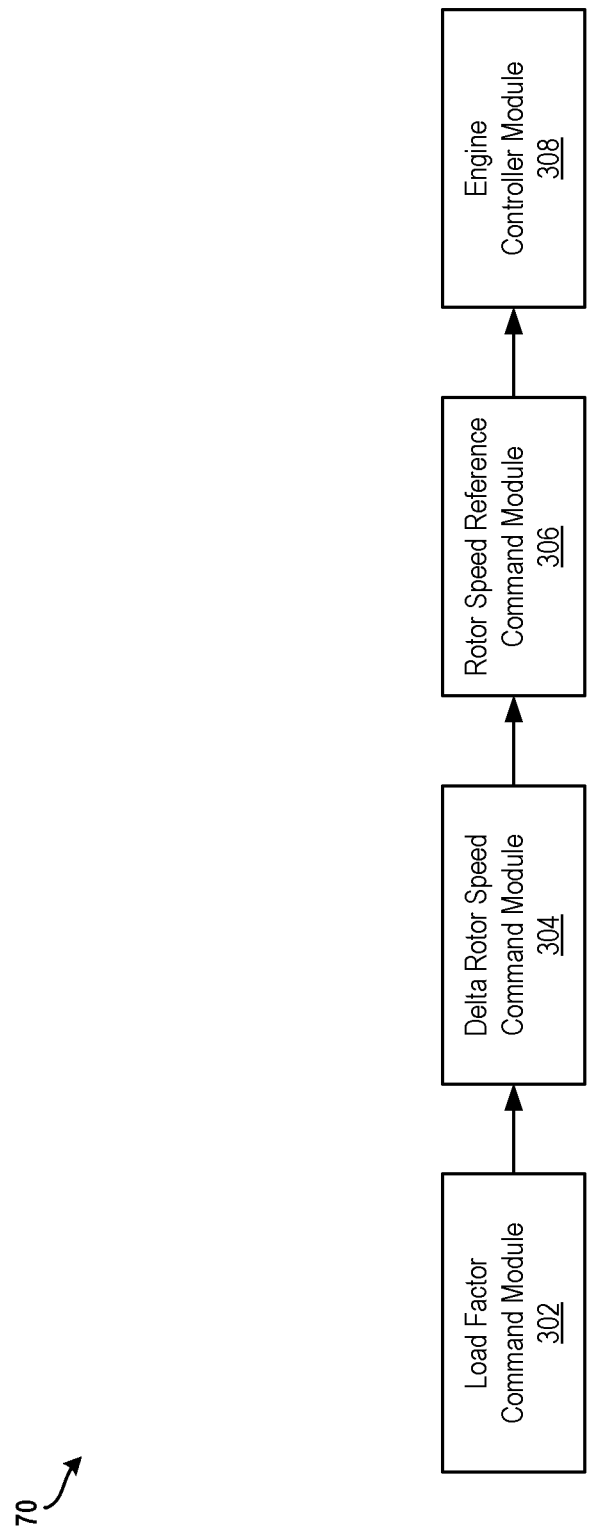
FIG. 3 illustrates a block diagram of the flight control system of FIG. 2 according to examples of the present disclosure.

Turning now to FIG. 3, FIG. 3 illustrates a block diagram of the flight control system 70 of FIG. 2 according to examples of the present disclosure. The various components, modules, engines, etc. described regarding FIG. 3 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus a system memory can store program instructions that when executed by the processing device implement the engines described herein. Other engines may also be utilized to include other features and functionality described in other examples herein.

The flight control system may include a load factor command module 302, a delta rotor speed command module 304, a rotor speed reference command module 306, and an engine controller module 308. Alternatively or additionally, the flight control system 70 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The load factor command module 302 receives flight characteristics such as pitch rate, vertical rate, pitch attitude (theta), roll attitude (phi), velocity, etc. from the flight controller computer (FCC) 75 of FIG. 2 or from other suitable sources. The load factor command module 302 determines a change in load factor (i.e., delta load factor) based on the received flight commands (i.e., pilot commands) and flight information. For example, when a pilot initiates a command to maneuver the aircraft, a flight command is sent to the load factor command module 302. The load factor may indicate pitch rate, velocity, vertical acceleration, roll attitude, and other flight factors.

The delta rotor speed command module 304 receives the delta load factor from the load factor command module 302. Using the received delta load factor, the delta rotor speed command module 304 determines a change in rotor speed responsive to the change in load factor. For example, if the pilot initiates a maneuver (e.g., an increase in pitch rate, etc.) that needs an increase in rotor speed, the delta rotor speed command module 304 indicates that rotor speed should be increased. In some examples, the delta rotor speed command module 304 may also receive flight information such as velocity that may be used to determine the change in rotor speed. In another example, the pilot may issue a pilot command to change the rotor speed, such as increasing the rotor speed or decreasing the rotor speed. The change in rotor speed (i.e., delta rotor speed) is passed to the rotor speed reference command module.

The rotor speed reference command module 306 receives the delta rotor speed from the delta rotor speed command module 304 and generates a rotor speed command based on the current state of the rotor. The rotor speed command is sent to the engine controller module 308.

The engine controller module 308 receives the rotor speed command from the rotor speed reference command module 306 and implements the change rotor speed (i.e., increase or decrease rotor speed) indicated by the rotor speed command.

Figure 4:
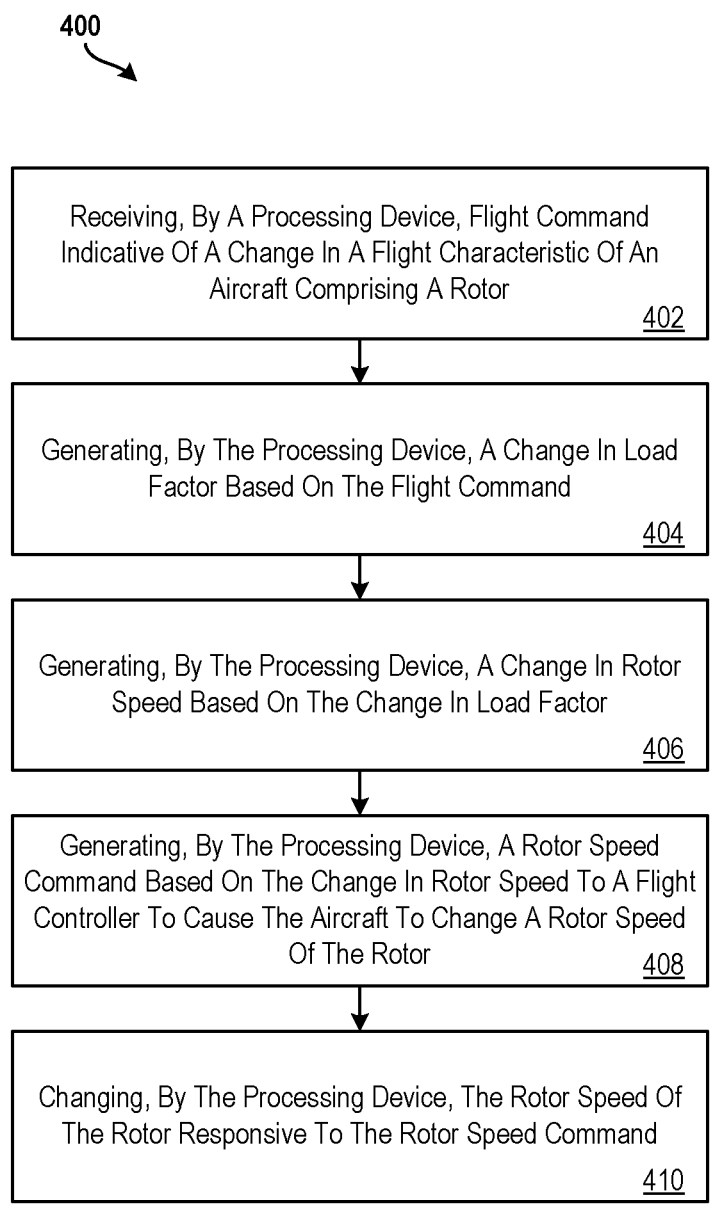
FIG. 4 illustrates a flow diagram of a method 400 for feed-forward rotor speed reduction according to examples of the present disclosure.

FIG. 4 illustrates a flow diagram of a method 400 for feed-forward rotor speed reduction according to examples of the present disclosure. The method 400 may be performed, for example, by the flight control system 70 of FIGS. 2 and 3.

At block 402, the method 400 includes receiving, by a processing device, flight command indicative of a change in a flight characteristic of an aircraft comprising a rotor. At block 404, the method 400 includes generating, by the processing device, a load factor change based on the flight command. At block 406, the method 400 includes generating, by the processing device, a rotor speed change based on the load factor change. At block 408, the method 400 includes generating, by the processing device, a rotor speed command based on the rotor speed change to a flight controller to cause the aircraft to change a rotor speed of the rotor. At block 410, the method 400 includes changing, by the processing device, the rotor speed of the rotor responsive to the rotor speed command.

In some examples, the change of the rotor speed represents an increase to the rotor speed responsive to an increase in the load factor. That is, when the load factor change is an increase, the rotor speed increases. In other examples, the change of the rotor speed represents a decrease to the rotor speed responsive to a decrease in the load factor. That is, when the load factor change is a decrease, the rotor speed decreases.

Additional processes also may be include, and it should be understood that the processes depicted in FIG. 4 represent illustrations, and that other processes may be added or existing processes may be removed, modified, or rearranged without departing from the scope and spirit of the present disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A computer-implemented method for feed-forward rotor speed control, the method comprising:
   receiving, by a processing device, a first flight command indicative of a flight characteristic change of an aircraft comprising a rotor;
   generating, by the processing device, a load factor change based on the flight command;
   generating, by the processing device, a rotor speed change based on the load factor change;
   generating, by the processing device, a rotor speed command based on the rotor speed change to a flight controller to cause the aircraft to change a rotor speed of the rotor; and
   changing, by the processing device, the rotor speed of the rotor responsive to the rotor speed command,
   wherein the first flight command is responsive to a first pilot command from a pilot of the aircraft, and the second flight command is responsive to a second pilot command from the pilot of the aircraft.

2. The computer-implemented method of claim 1, wherein the change of the rotor speed represents an increase to the rotor speed responsive to an increase in the load factor.

3. The computer-implemented method of claim 1, wherein the change of the rotor speed represents a decrease to the rotor speed responsive to a decrease in the load factor.

4. The computer-implemented method of claim 1, wherein the first pilot command and the second pilot command are commands to maneuver the aircraft.

5. The computer-implemented method of claim 1, wherein the load factor change is further based on flight information.

6. The computer-implemented method of claim 5, wherein the flight information is a velocity.

7. The computer-implemented method of claim 1, wherein the flight characteristics are selected from the group consisting of a pitch rate, a vertical rate, a pitch attitude, a roll attitude, and a velocity.

8. A processing system for feed-forward rotor speed control using a feed-forward rotor speed reduction command, the system comprising:
   a memory having computer readable instructions; and
   a processing device for executing the computer readable instructions to perform a method, the method comprising:
   receiving, by the processing device, a first flight command indicative of a first flight characteristic change of an aircraft comprising a rotor;
   generating, by the processing device, a first load factor change based on the first flight command;
   generating, by the processing device, a first rotor speed change based on the first load factor change;
   generating, by the processing device, a first rotor speed command based on the first rotor speed change to a flight controller to cause the aircraft to change a rotor speed of the rotor to a first rotor speed; and
   increasing, by the processing device, the rotor speed of the rotor responsive to the rotor speed command,
   wherein the first flight command is responsive to a first pilot command from a pilot of the aircraft, and a second flight command is responsive to a second pilot command from the pilot of the aircraft.

9. The processing system of claim 8, wherein the method further comprises receiving, by the processing device, the second flight command indicative of a second flight characteristic change of the aircraft.

10. The processing system of claim 9, wherein the method further comprises generating, by the processing device, a second load factor change based on the second flight command.

11. The processing system of claim 10, wherein the method further comprises generating, by the processing device, a second rotor speed change based on the second load factor change.

12. The processing system of claim 11, wherein the method further comprises generating, by the processing device, a second rotor speed command based on the second rotor speed change to the flight controller to cause the aircraft to change the rotor speed of the rotor to a second rotor speed.

13. The processing system of claim 12, wherein the method further comprises decreasing, by the processing device, the rotor speed of the rotor responsive to the rotor speed command.

* * * * *